Sept. 29, 1942.  C. A. WILLARD  2,297,377
FRUIT TREATING MACHINE
Filed June 30, 1939  4 Sheets-Sheet 1
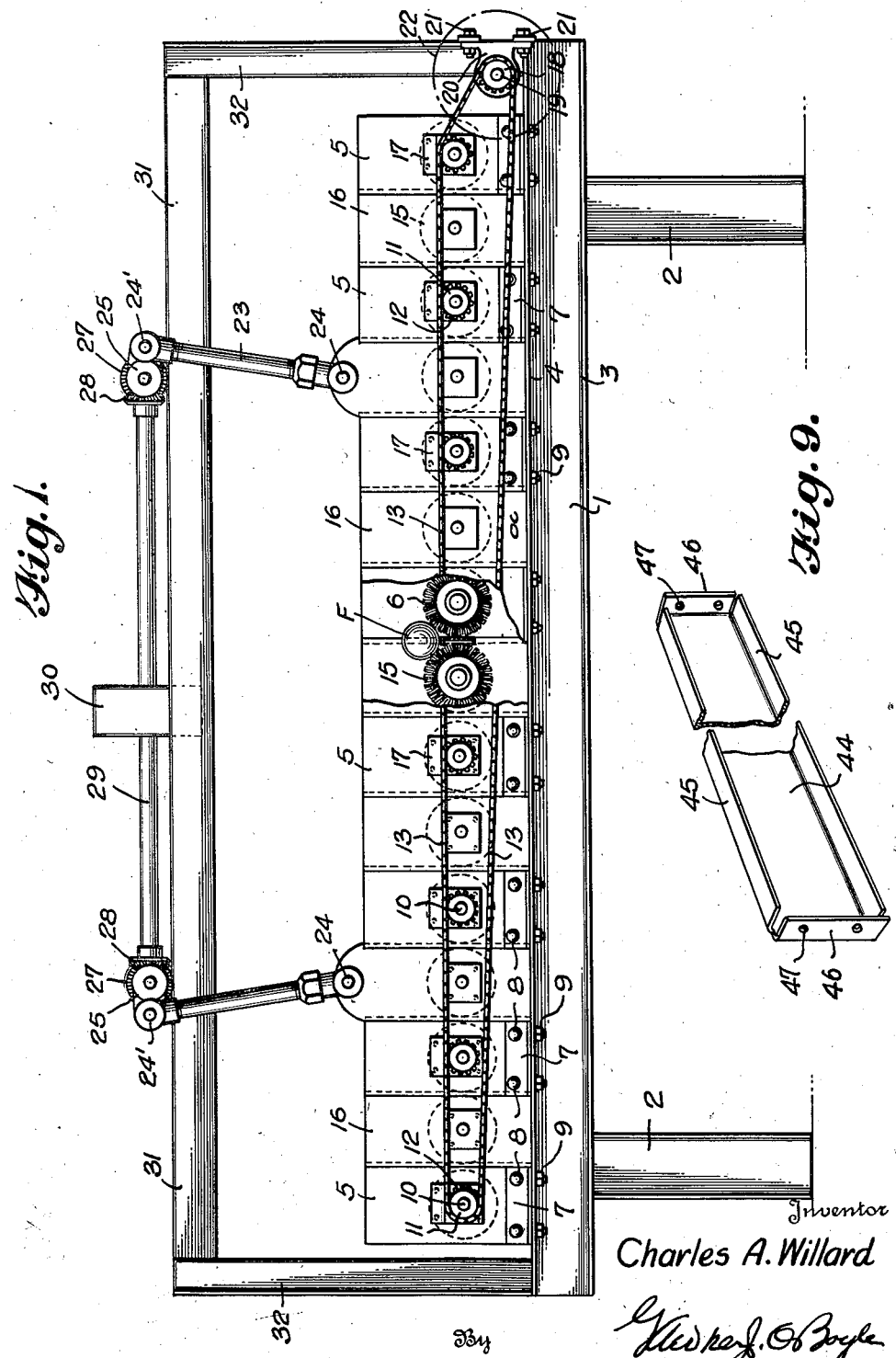
Inventor
Charles A. Willard
By George J. O'Boyle
Attorney

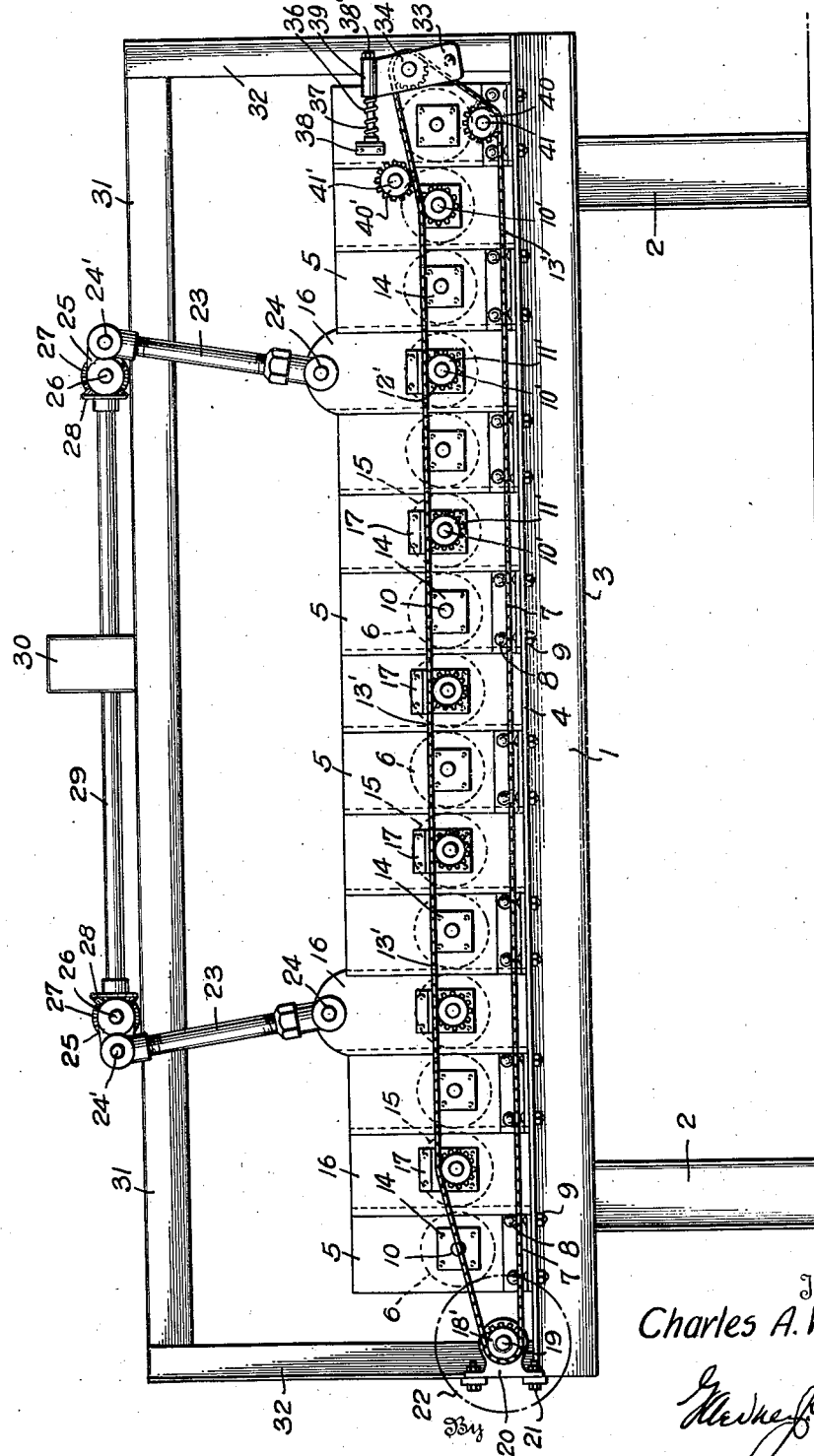

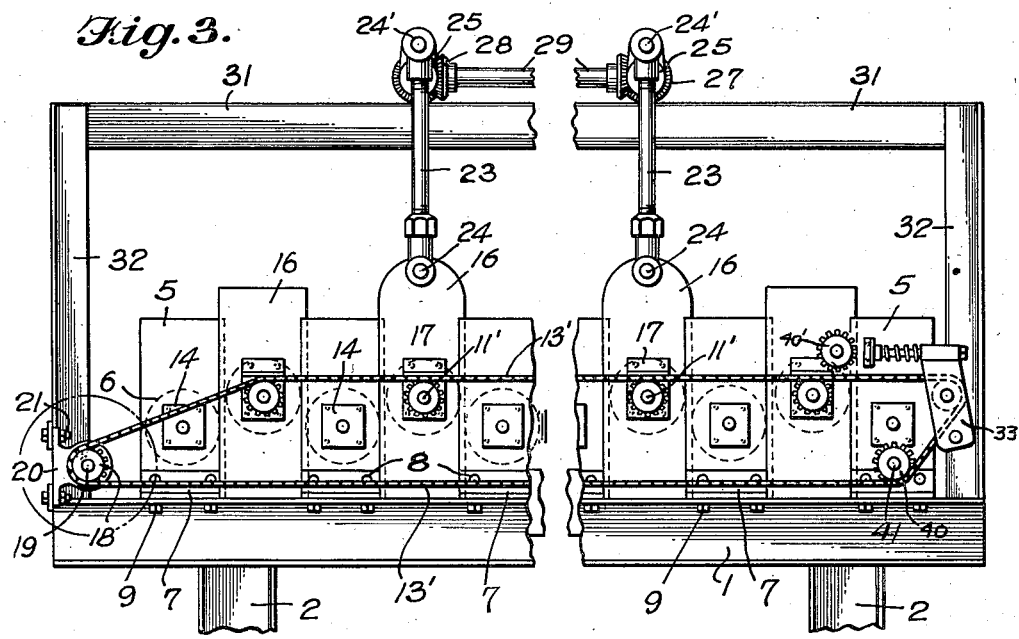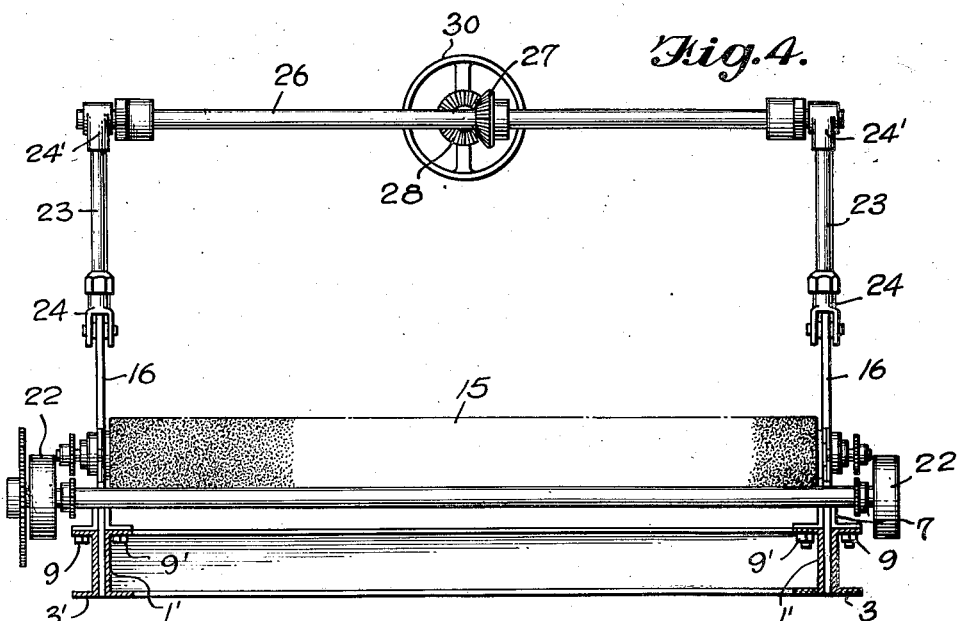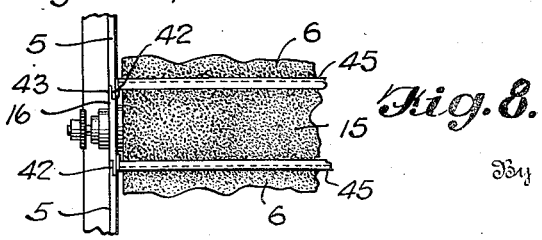

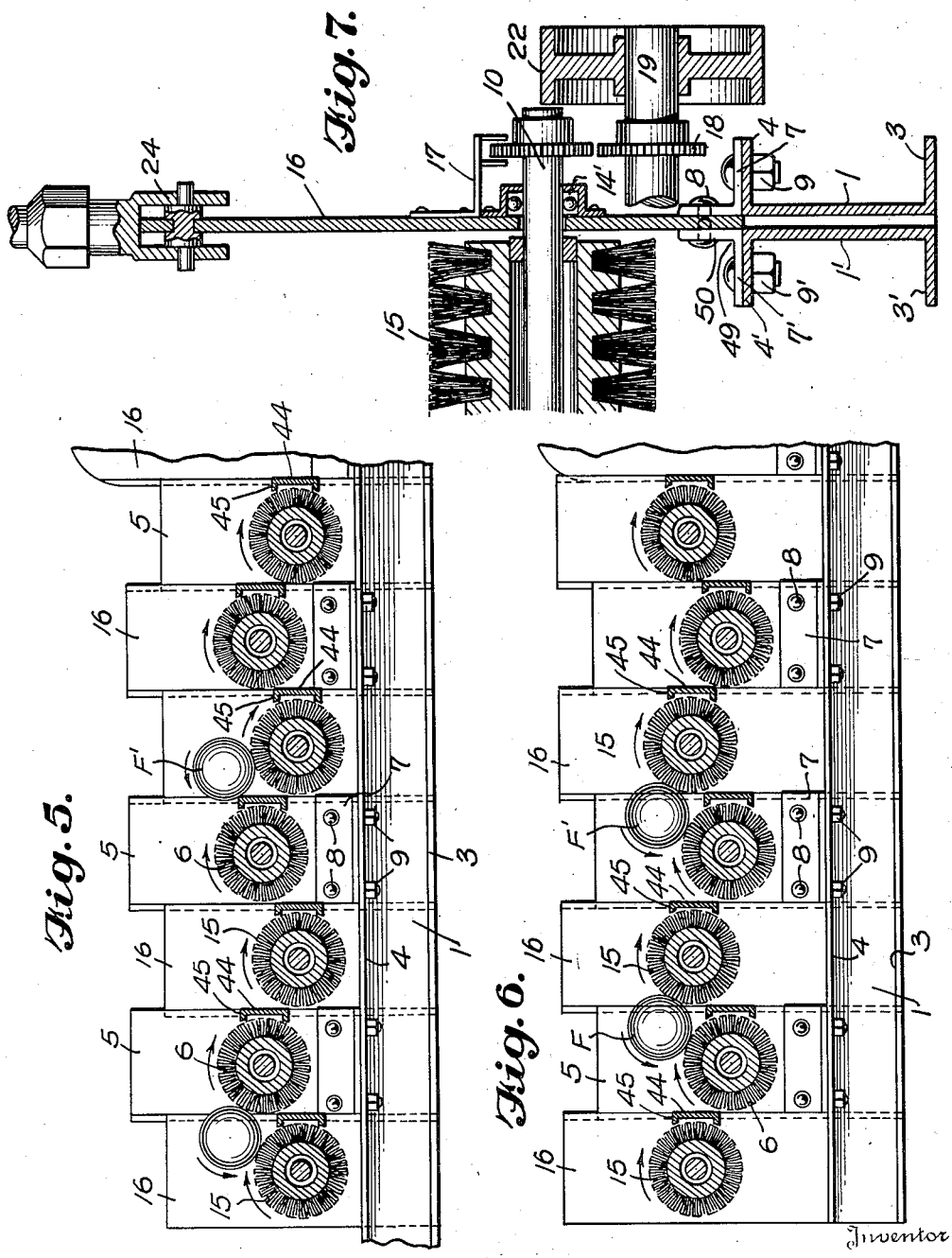

Patented Sept. 29, 1942

2,297,377

UNITED STATES PATENT OFFICE 2,297,377

FRUIT TREATING MACHINE

Charles A. Willard, Orlando, Fla., assignor to Fruit Treating Corporation, Orlando, Fla.

Application June 30, 1939, Serial No. 282,277

4 Claims. (Cl. 146—202)

My invention relates to fruit and vegetable treating machines and more particularly to machines adapted for cleaning and polishing citrous fruits.

In application S. N. 160,526, filed August 23, 1937, which became Patent No. 2,221,159 on Nov. 12, 1940, I have disclosed an improved fruit cleaning machine wherein alternate brushes are vertically reciprocated a sufficient extent to move the fruit from one brush to the other transversely of their axes. As explained in my prior application, the fruit to be cleaned is introduced at one end of the machine, and as it moves across the brushes, it is simultaneously rotated so that the entire surface of each individual fruit is subjected to brushing and cleaning through the medium of the rotatable vertically reciprocating and fixed brushes.

It will be appreciated that in the treatment of fruit, as for example cleaning it by means of rotatable brushing members, that the fruit of necessity must be rotated about a constantly changing axis in order that all points of its surfaces be exposed to and contacted with the brushing medium. Ordinarily, sufficient rotation is imparted to the fruit by the rotating brushes to effect the desired cleaning, however, it sometimes happens that certain of the fruit moves in a fixed path, that is to say, rotation thereof is about substantially the same axis during the passage through the machine.

I have found, after considerable research and experimentation, that improved cleaning of the fruit can be obtained if means are provided, in combination with the brushing elements, adapted to assist the fruit in its movement over adjacent brushes. More particularly, I have found that by interposing filler strips between adjacent brushes, the strips being constructed and arranged with respect to the peripheral surfaces of the brushes so that a portion of the strips contact the fruit at certain periods during its travel through the machine, the fruit is not only assisted in its movement over the brushes, but it is also compelled to rotate about a constantly changing axis.

An object of my invention is to provide an improved fruit treating machine, of the character wherein the fruit to be cleaned is moved transversely of the axes of a plurality of rotatable brushing elements, having means to assist the fruit in its movement over adjacent brushes.

Another object of my invention is to provide an improved fruit treating machine wherein the fruit to be cleaned is subjected to a thorough brushing at all points on its surface during passage through the machine.

Yet another object of my invention is to provide an improved fruit treating machine having means interposed between successive brushes adapted to contact the fruit at certain intervals of its travel through the machine whereby the fruit is compelled to rotate or spin about a constantly changing axis.

Still another object of my invention is to provide an improved fruit treating machine wherein the fruit to be cleaned is moved transversely of the axes of the brushes, movement of the fruit across the brushes being effected by means of vertical reciprocation of alternate brushes.

A still further object of my invention is to provide an improved fruit treating machine constructed and arranged whereby the fruit to be treated moves across the brushes at a substantially constant rate so that each individual fruit is subjected to uniform brushing.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is an elevational view, partly in section, showing one side of the machine.

Figure 2 is an elevational view of the opposite side of the machine shown in Fig. 1.

Figure 3 is a partial elevational view of the side of the machine shown in Fig. 2, the vertically movable brushes being in a raised position.

Figure 4 is a sectional view taken along line 4—4 of Fig. 3.

Figure 5 is a longitudinal sectional view taken along line 5—5 of Fig. 4.

Figure 6 is a longitudinal sectional view taken along line 6—6 of Fig. 4.

Figure 7 is an enlarged sectional view showing a portion of a brush, together with the drive means and arrangement of the brush support frame.

Figure 8 is a fragmentary plan view showing the overlapping arrangement of the brush supporting end-plates; and Figure 9 is a perspective view of one of the filler strips.

The fruit treating machine of the present invention comprises generally a substantially rectangularly shaped body portion or frame, mounted upon suitable supports, at a convenient height above the floor or ground level. The brushing elements, in the form of rotatable brushes are mounted transversely of the length of the machine, forming a bed or support for the fruit to be treated, and means are provided whereby alternate brushes are vertically reciprocated to move the fruit across the brushes, transversely of their axes.

Referring to the drawings, and more particularly to Figs. 1 and 2, wherein side elevational views are shown, the machine comprises side frame members 1 mounted upon suitable supports 2. The side members are formed with outwardly extending flange portions 3 and 4, at the bottom and top thereof, the top flange forming a support for the end plates 5, on which the stationary or fixed brushes 6 are rotatably mounted. End plates 5 may be conveniently attached and supported on the side members 1 by means of angle members 7, adapted to be attached to the lower outside surfaces of the plates by rivets or bolts 8 and to the outwardly extending flange 4 by bolts 9 or other suitable fastening means.

The ends of the rotatable stationary brush shafts 10, on the side of the machine shown in Fig. 1, extend through the plates 5, and the end of each shaft is provided with a sprocket member 11 suitably keyed or otherwise fixed thereto, the gear teeth 12 being adapted to engage with slots or apertures formed in a drive chain 13 whereby all of the stationary brushes are simultaneously rotated in the same direction. The ends of shafts 10, on the opposite side of the machine, Fig. 2, are adapted to be supported in plates 5 by means of suitable bearings designated generally by numeral 14 which are preferably of the enclosed type.

The brushes 15, which are adapted to reciprocate vertically, are rotatably mounted upon end members or plates 16, constructed and arranged for sliding movement with respect to the stationary plates, 5, as will be described more fully hereinafter. In order to support members 16 for vertical movement, they are attached to a movable frame adapted to fit down within the opening formed between the ends of the machine and the main side members 1. The ends of shafts 10' of the vertically movable brushes 15 extend through plates 16, Fig. 2, and are provided with sprockets 11' having teeth 12' adapted to engage with the openings in a drive chain 13', whereby upon movement of the drive chain, the brushes are all rotated in the same direction.

In connection with the arrangement of the drive chains 13 and 13' it will be noted that they are trained over sprockets 11 and 11', attached to the ends of the brushes and that chain guard means 17 are provided, in order to prevent accidental displacement of the chains from engagement with the sprockets. Movement of the drive chains is effected through the medium of sprockets 18, 18' attached to the ends of a shaft 19 extending crosswise of the machine at one end thereof. Drive shaft 19 is suitably mounted on the frame of the cleaning machine by means of suitable brackets 20 attached to the frame by means of bolts 21. The drive shaft is provided with pulleys 22 adapted to be connected by belt means to a suitable source of power, not shown.

The frame to which the plates 16 are attached and which fits down into the opening formed between the ends and main side members 1 of the machine is adapted to be vertically reciprocated by means of a link arrangement comprising arms 23 attached to two of the plates 16 on opposite sides of the machine. The arms 23 are pivoted to the plates as at 24 and to links 25 as at 24', the links being keyed to shafts 26 having gears 27 attached thereto. The gears 27 are adapted to mesh with gears 28, keyed or otherwise attached to a shaft 29 having a drive pulley 30, suitably connected with drive means, not shown. The reciprocating mechanism is supported on a top frame 31 attached to vertical members 32 which rest upon the side frames of the machine. It will be understood that the shafts 26 extend transversely of the machine in the same plane with drive shaft 29, which is arranged perpendicular to the axes of these shafts, as more clearly shown in Fig. 4.

In the operation of the machine, as so far described, when power is applied to pulleys 22 to rotate the main drive shaft 19, all of the brushes are rotated through the medium of drive chains 13 and 13', which are trained over sprockets 11 and 11' of the stationary and vertically movable brushes respectively, and over sprockets 18 and 18' attached to the ends of the drive shaft 19. Simultaneously with the rotation of the brushes, rotary movement is also imparted to shaft 29 through the medium of pulley 30, whereby gear members 27 and shafts 26 to which these gears are attached are rotated. Rotary movement of shafts 26 causes links 25, which are attached to the ends of these shafts to be rotated, thus actuating the arms 23 whereby vertical movement is imparted at all of the end plates 16 upon which brushes 15 are mounted, to be raised and lowered with respect to the stationary brushes.

In order to compensate for the variation in the effective length of the drive chain when the frame to which the plates 16 is raised and lowered within the main body portion of the machine, an automatic tensioning device is provided, comprising a housing 33 pivotally attached to one of the vertical members 32 and having a pulley 34 mounted therein. As will be seen in Fig. 2, the bracket or housing 33 is maintained under tension by means of a spring 36 surrounding a plunger 37 attached to one of the fixed end plates 5 as at 38, the end of the plunger 38' being adapted to fit into a recess or slot 39 formed on the housing. By means of this arrangement, the drive chain 13 is automatically taken up at predetermined intervals of movement of the vertically reciprocating plates and the take-up device affords means for adjustment so that the effective length of the chain can be shortened in case of wear of the chain or sprockets. Idler sprockets 40 and 40' mounted upon stub shafts 41 and 41' are also provided so that the lower run of chain 13' is maintained in a substantially straight line position out of contact with flange 4 and fastening means 7 which support the fixed plates 5 on the side frame.

Referring to Fig. 3, end plates 16 are shown in the position which they occupy when arms 23 are at their uppermost position of lift, that is to say, the vertical brushes are then in the raised position due to movement of links 25 upwardly into vertical position with arms 23.

Referring to Fig. 4, it will be noted that plates 16, to which the movable brushes 15 are attached, are mounted upon side members 1' of substantially the same configuration as side members 1 of the main frame of the machine. Plates 16 are attached to side members 1' by riveting or welding the plates thereto, so that the side frames, plates 16 and brushes 15 move as a unit a short distance above the bottom of the machine, when reciprocating movement is imparted to the plates through the medium of arms 23. In connection with the arrangement of the movable plates 16 with respect to fixed plates 5, it will be noted, as shown in Fig. 8, that the edges of plates 5 are cut away to form vertical lugs 42 and that the movable plates 16 are similarly cut to form projections or lugs 43 adapted to interfit with the lugs formed on plates 5 to provide closed joints between the adjacent edges of the plates. The purpose of this arrangement is to prevent water or other liquid which is used in the cleaning process from splashing or leaking out into contact with the drive chain or other moving parts of the machine.

As indicated hereinbefore, one of the principal objects of the present invention is to provide means, in combination with the rotatable brushes, adapted to contact the fruit at certain intervals during the cleaning operation so that movement of the fruit is in a predetermined path and about a constantly changing axis. The improved means used to assist the fruit over the brushes and also compel it to rotate or spin about a constantly changing axis, comprises a filler strip member adapted to be interposed between successive brushes in the vicinity of the peripheries thereof. As shown in Fig. 9, the filler strip comprises a body portion 44, having upturned flanges 45 and 46, along its sides and ends respectively. The end flanges 46 are provided with openings 47 adapted to receive bolts or other fastening means used to attach the filler strip to the brush supporting end plates 5 and 16. As shown in Figs. 5 and 6, the filler strips are mounted in parallel relationship with respect to the axes of the brushes and are spaced a short distance from the peripheries thereof so that clearance is obtained between the extremities of the brush bristles and the inner edges of the side flanges 45. It will also be noted that the filler strips are positioned in line with a mean horizontal plane through the brush axes, that is, the body portions of the strips are arranged symmetrically with respect to the horizontal. In mounting the filler strip in the operative position between successive brushes, end flanges 46 are adapted to be bent outwardly into contact with the inner faces of plates 5 and 16, and thereafterwards bolted or welded to the plates, as shown at 48, Fig. 5.

The function and operation of the filler strips will be readily understood by reference to Fig. 5 and Fig. 6. In Fig. 5 the reciprocating brushes are shown in their lowermost position, that is, the position which they occupy when arms 23 have reached the limit of their downward movement. In this position of the brushes, it will be noted that the filler strips attached to the stationary plates 5 are above the strips which are attached to plates 16. Assuming that all of the brushes are rotating in the direction indicated, the fruit, F, supported in the valley between the first two brushes is rotated therebetween and subjected to a vigorous brushing action. When the relative position of the brushes is changed, that is to say, when brushes 15 are moved upwardly, the fruit tends to advance to the next trough or valley between the second and third brushes and so on through the machine. During reciprocation of the brushes 15, the upper side flanges 45 of the filler strips are brought into contact with the lower portion of the fruit which is exposed between the peripheral surfaces of the brushes, as for example, in the position assumed by fruit, F', as it advances over one of the brushes 16 into the next trough.

In Fig. 6, the reciprocating brushes are shown in their uppermost position, that is, the position which they occupy when the arms 23 are raised to the highest points of their travel. As here shown, fruit F and F' are supported in the valleys or troughs formed between adjacent brushes out of contact with the filler strips. It will be understood that on downward movement of the brushes, the filler strip below fruit F will contact with the under surface of the fruit, momentarily stopping its rotation, and on further movement of the brushes, exert a lift or upward thrust on the fruit, causing it to advance to the next trough. Similarly with fruit F', the filler strip below this particular fruit will contact with its under surface in the manner above described, causing it to spin about a different axis than before contact with the strip and also exert an upward thrust to lift the fruit over the brush into the next trough.

It will be appreciated that by means of the present invention, the fruit to be treated is subjected to a thorough brushing during its passage through the machine, and that due to the construction and arrangement of the filler strips, the fruit is compelled to move transversely of the axes of the brushes in such a manner that the entire surface of each individual fruit is exposed to the brushes, by reason of its rotation about a constantly changing axis. In addition to improved cleaning of the fruit, I have found that the volume of fruit which can be processed in a given time, by the machine of the present invention, is considerably greater than the volume processed in the same time by conventional types of transverse machines.

In view of the fact that movement of the fruit through the machine is not entirely dependent upon the rotatable brushes, and more particularly since means are provided, in combination with the brushes, to assist the fruit across the brushes, movement of the fruit through the machine is substantially speeded up without sacrificing any of the required necessary brushing. In other words, by reason of the design of the filler strips, and their arrangement with respect to the brushes, the fruit not only moves through the machine faster, but it is also subjected to the desired brushing at all points on its surface. In this connection, it will be appreciated that the fruit receives maximum brushing when it is at rest, that is, when rotation thereof is momentarily stopped, by reason of its contact with the filler strip.

Referring to Fig. 7, which is an enlarged sectional view through the end of one of the vertical movable brushes, it will be noted that the brush shaft 10' passes through plate 16 and that the plate extends downwardly to the top portion of side members 1 and 1'. The side plate is attached to 1' by means of suitable angle members 49 adapted to be bolted to flange 4' by bolts 9' and to the plate by means of rivoting or welding, as shown at 50. Suitable bearings 14' are also provided for the brushes.

While I have shown and described the preferred embodiment of my invention, I wish it to be understood that I do not confine myself to the precise details of construction herein set forth, by way of illustrations as it is apparent that many changes and variations may be made therein, by those skilled in the art, without departing from the spirit of the invention, or exceeding the scope of the appended claims.

I claim:

1. A fruit treating machine comprising a frame having side and end members, a bed of rotary brushes arranged in fruit supporting relationship, of which alternate brushes turn on fixed axes and intervening brushes on vertically movable axes, mounting means for the intervening brushes to permit bodily movement of the same vertically of their axes, comprising a vertically reciprocating frame having side and end members positioned within said first frame, means to rotatively support the brushes on said frames comprising vertical brush bearing support plates attached to the side members of the respective frames, the edges of adjacent plates having complementary cut-out portions arranged in overlapping relationship and forming closed joints between the adjacent co-planar plates, means for rotating all of the brushes in the same direction, comprising sprockets attached to each of the brushes, chains trained over the sprockets, and means to drive said chains, means for reciprocating the movable frame a sufficient extent to move the fruit from one brush to another transversely of their axes, whereby alternate intervening brushes are bodily vertically reciprocated from points below to points above the plane of the remaining brushes, and means interposed between successive brushes, comprising a filler strip having a body portion formed with side and end flanges, said flanges lying in planes perpendicular to the body portion of the strip, the end flanges being attached to the brush supporting plates, the flat upper side flange of the strip being adapted to contact with the under surface of the fruit exposed between the brushes, whereby the axis of rotation of the fruit is changed simultaneously with its movement over the brushes.

2. A fruit treating machine comprising a frame having side and end members, a bed of rotary brushes arranged in fruit supporting relationship of which alternate brushes turn on fixed axes and intervening brushes on vertically movable axes, means for rotating all of said brushes in the same direction, mounting means for the intervening brushes to permit bodily movement of the same vertically of their axes comprising a vertically reciprocating frame having side and end members positioned within said first frame, means to rotatively support the brushes on said frames comprising vertical brush bearing support plates attached to the side members of the respective frames, the edges of adjacent plates having complementary cut-out portions arranged in overlapping relationship and forming closed joints between the adjacent co-planar plates, means for reciprocating the vertically movable frame a sufficient extent to move the fruit from one brush to another transversely of their axes comprising an over-head linkage, supported on the stationary frame, said linkage having arms attached to the upper extremities of certain of the brush bearing support plates on opposite sides of the frame, and means interposed between successive brushes, comprising a filler strip having end flanges attached to said plates, and having a flat upper side flange adapted to contact the under surface of the fruit which is exposed between the brushes to change its axis of rotation and exert an upward thrust thereon, whereby the fruit is compelled to move across the brushes.

3. A fruit treating machine comprising a frame having side and end members, a bed of rotary brushes arranged in fruit supporting relationship, of which alternate brushes turn on fixed axes and intervening brushes on vertically movable axes, means for rotating all of the brushes in the same direction, mounting means for the intervening brushes to permit bodily movement of the same vertically of their axes, comprising a vertically reciprocating frame having side and end members positioned within said first frame, means to rotatively support the brushes on said frames comprising vertical brush bearing support plates attached to the side members of the respective frames, the edges of adjacent plates having complementary cut-out portions arranged in overlapping relationship and forming closed joints between the adjacent co-planar plates, means interposed between successive brushes, comprising a filler strip having a body portion formed with side and end flanges, said flanges lying in planes perpendicular to the plane of the body portion of the strip, the end flanges being attached to the brush supporting plates, the flat upper side flange of the strip being adapted to contact with the under surface of the fruit supported between the brushes and exert an upward thrust thereon, whereby the axis of rotation of the fruit is changed simultaneously with its movement over the brushes.

4. A fruit treating machine comprising a frame having side and end members, a bed of rotary brushes arranged in fruit supporting relationship, of which alternate brushes turn on fixed axes and intervening brushes on vertically movable axes, means for rotating all of the brushes in the same direction, mounting means for the intervening brushes to permit bodily movement of the same vertically of their axes, comprising a vertically reciprocating frame having side and end members positioned within said first frame, means to rotatively support the brushes on said frames comprising vertical brush bearing support plates attached to the side members of the respective frames, the edges of adjacent plates having complementary cut-out portions arranged in overlapping relationship and forming closed joints between the adjacent co-planar plates, means for reciprocating the inner frame a sufficient extent to move the fruit from one brush to another transversely of their axes, comprising an over-head linkage supported on the stationary frame, said linkage having arms attached to the upper extremities of certain of the brush bearing support plates on opposite sides of the frame, means interposed between successive brushes, comprising a filler strip having a body portion formed with side and end flanges, said flanges lying in planes perpendicular to the plane of the body portion of the strip, the end flanges being attached to the brush supporting plates, the flat upper side flange of the strip being adapted to contact with the under surface of the fruit supported between the brushes and exert an upward thrust thereon, whereby the axis of rotation of the fruit is changed simultaneously with its movement over the brushes.

CHARLES A. WILLARD.